March 31, 1970 R. HAFNER 3,503,572
VERTICAL TAKE-OFF AND LANDING AIRCRAFT
Filed Dec. 4, 1967 2 Sheets-Sheet 1

United States Patent Office 3,503,572
Patented Mar. 31, 1970

3,503,572
VERTICAL TAKE-OFF AND LANDING AIRCRAFT
Raoul Hafner, Yeovil, England, assignor to Westland Aircraft Limited, Yeovil, Somerset, England
Filed Dec. 4, 1967, Ser. No. 687,747
Claims priority, application Great Britain, Dec. 12, 1966, 55,651/66
Int. Cl. B64c 27/28
U.S. Cl. 244—7                                                          7 Claims

ABSTRACT OF THE DISCLOSURE

A boundary layer control arrangement for a movable lift surface of a convertible rotorcraft having one or more lift rotors is provided wherein air bled from a compressor or a gas generator for driving the rotors provides boundary layer control of a part or the whole of a tilting wing or lift surface of the convertible rotorcraft.

---

Figure 1:
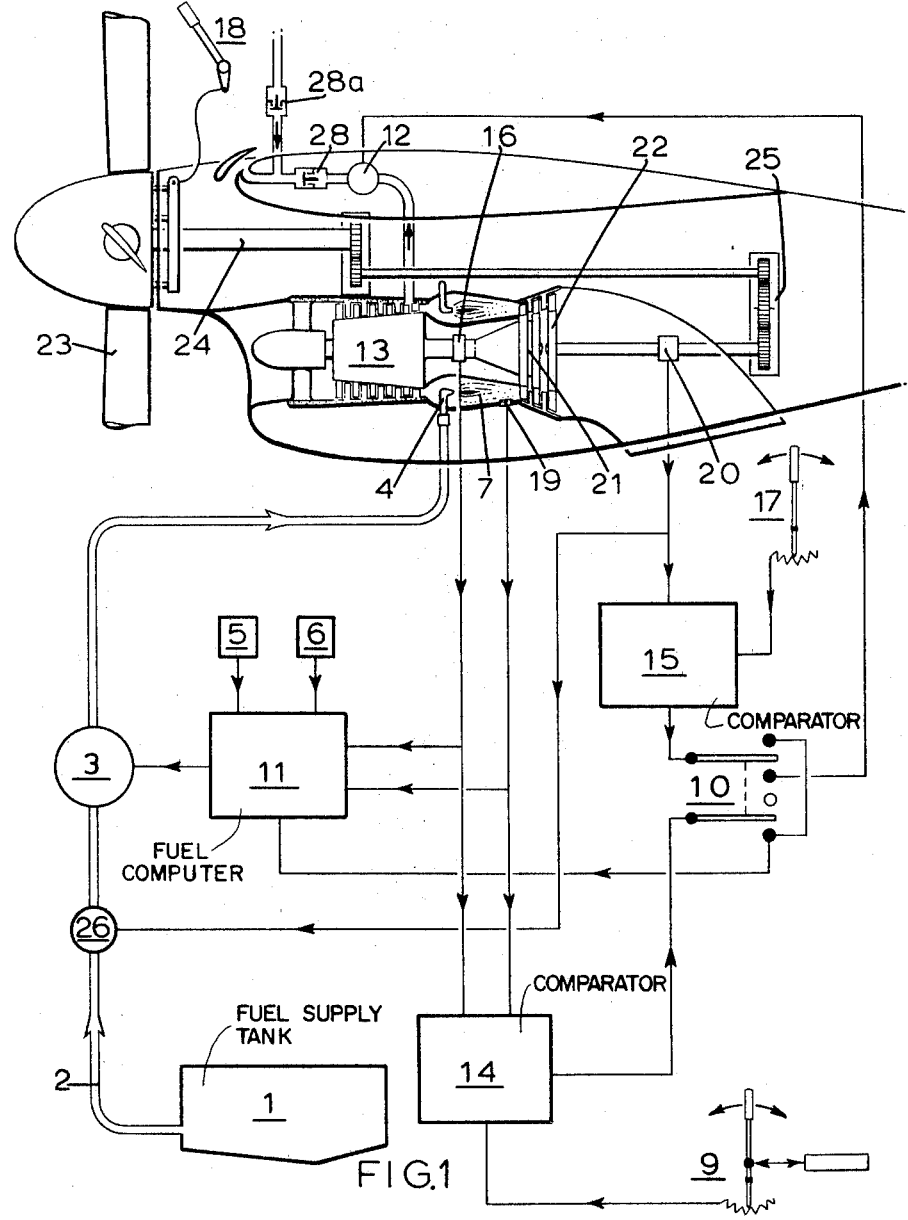

This invention relates to convertible rotorcraft capable of vertical take-off and landing, and forward flight at high speeds. The invention embraces the use of tiltable wings and includes rotor/propellers which, during the transition from forward flight to hover and vertical landing, or from vertical take-off to forward flight, may be used as rotary wings for lift or alternatively as propellers for propulsion.

This invention is particularly concerned with the integration of an automatic engine power control during the transition periods to provide air for boundary layer control of part or whole of a tilting wing or lift surface of a convertible rotorcraft from one or more motive power gas generators of the free turbine type.

During the "transition" phases of flight of a tilt wing aircraft certain changes take place in the power requirements of the propeller/rotor, as well as in the angle of attack of the titltable wing/s. Sufficient engine power must be available at all periods of the transition, and it is essential that the wing or lifting surface is kept free of stall conditions throughout these transitions.

These requirements and changes are not the same for both transition conditions, which will hereinafter be referred to as the "up" transition for rotary wing to fixed wing flight, and the "down" transition for fixed wing to rotary wing flight.

In the "up" transition mode, maximum shaft power is required from the engine/s during lift-off and initial hover. As the transition proceeds there is a gradual fall off of shaft power until the transition is completed and fixed wing flight is achieved. The final power requirement, however, is still a fairly high percentage of the maximum power. During the "up" transition the relative angle of attack of the wing is unlikely to reach a condition involving severe stalling due to the gradual increase of forward speed and boundary layer control may not be necessary.

During the "down" transition in flight the conditions differ inasmuch as the shaft power requirement is considerably lower at the commencement of the transition, and does not increase substantially until approximately half way through the transition. The angle of attack of the tiltable wing up to this period of the transition has increased, and requires boundary layer control to prevent stalling of the wing resulting from the rapid decrease of forward speed. One of the critical requirements for boundary layer air supply substantially coincides with this condition of minimum engine shaft power, and allows air and/or gas to be available for this purpose.

It is an object of this invention to improve the efficiency of the convertible rotorcraft by the supply of boundary layer air to aerofoil surfaces as required, without the necessity of additional power means.

According to the invention we provide a boundary layer control of a movable lift surface for a convertible rotorcraft having one or more lift rotors, said rotors being movable from a substantially horizontal position to a substantially vertical position for propulsion purposes, characterised in that air bled from a compressor or gas generator driving said rotor/s provides boundary layer control of a part or whole of a tilting wing or lift surface of said convertible rotorcraft.

In one embodiment of the invention air bled from the compressor or gas generator is automatically controlled and proportioned by an integrated system operably associated with the gas generator driving said rotor/s, the integrated system comprising an air bleed valve, speed and temperature comparators, and temperature, pressure, and speed sensors or transducers.

In a further aspect of the invention, the system is operably associated with the engine fuel computer, rotor speed governor, and engine speed governor, giving automatic integration of a boundary layer control in relation to the power requirements of the convertible rotorcraft.

Figure 2:
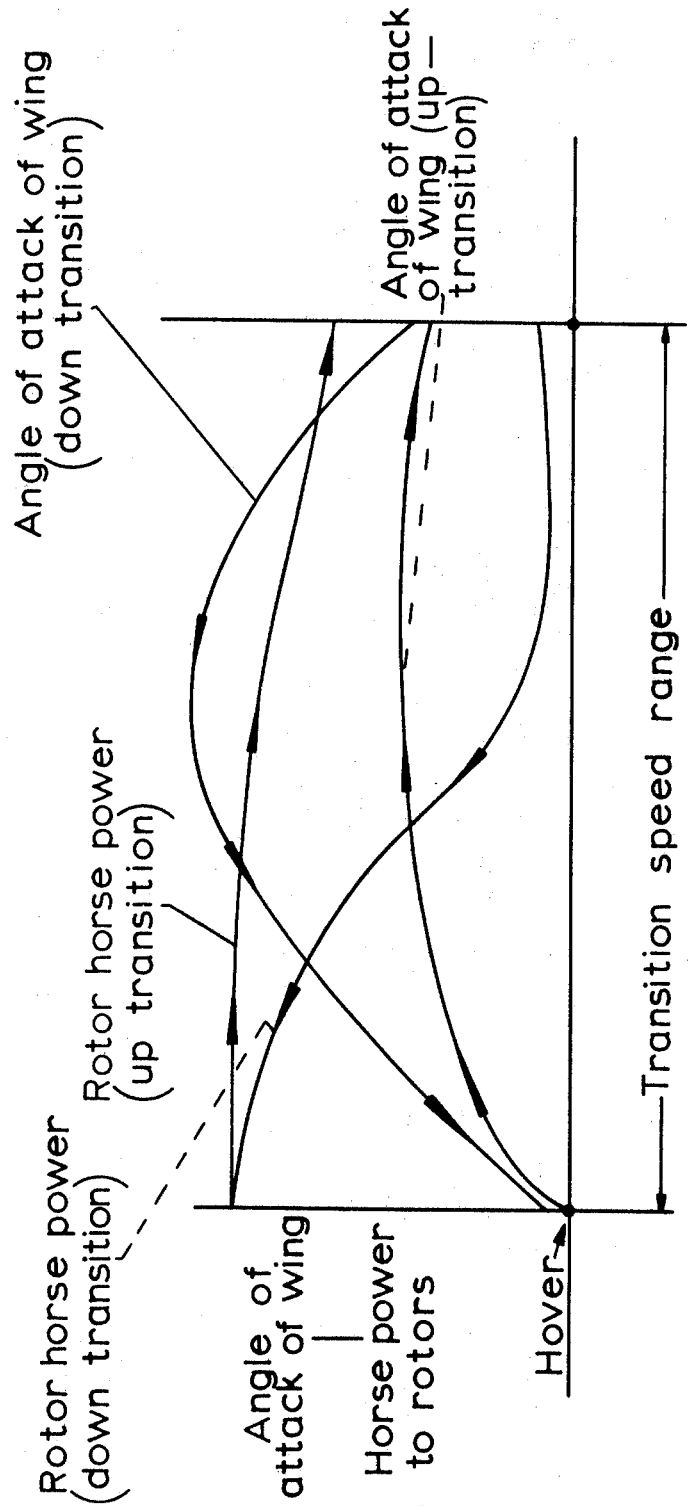

The invention will now be described with reference to the accompanying diagrammatic drawings, in which:

FIGURE 1 shows in diagrammatic form the integrated operation of the boundary layer control with the free turbine engine/s and rotor/propellers, and FIGURE 2 shows the relationship of power required and angle of attack of the tiltable wing during the "up" and "down" transition.

In operation of the invention referring to FIGURE 1, the following sequence occurs at "take-off." The pilot sets the rotor or free turbine speed control lever 17 to the required r.p.m.; this switches in a suitable engine speed governor, rotor constant speed unit, and engine fuel computer, which are part of and associated with the engine itself and indicated at 11. This combination maintains a substantially constant rotor r.p.m., regardless of rotor blade pitch settings. Selection switch 10 has two positions, one for the "down" transition and the other for the "up" transition.

Selection of the "down" transition position operably associates bleed valve 12 with the sensing means relating to the engine shaft horse power requirements of the rotors, thereby automatically opening or closing said bleed valve supplying air for boundary layer control.

Selection of the "up" transition position disassociates bleed valve 12 from the engine and locks said valve fully closed, so that no air will be bled from the compressor, whatever the shaft horse power requirements may be.

Operation of the collective pitch lever 18 automatically controls the engine power, namely maximum power for coarse pitch and decreasing power as the rotor blade pitch is made finer.

During the initial "take-off" in the "up" transition mode, when maximum engine shaft power is required, the air bleed valve 12 is closed and the system is under integrated automatic control. As the "up" transition proceeds the shaft horse power required by the rotor/s commences to decrease as the wing produces lift until the level flight mode is reached, when the rotor/s then act as propeller/s.

In this condition of "up" transition, the relative angle of attack of the wing is such that it is unlikely to require large quantities of air for boundary layer control.

When the "down" transition is selected in flight considerably less shaft horse power is required from the maximum forward speed at which the commencement of the transition is permitted, to approximately half way through the operation, and it is during this first part of the transition phase that the relative angle of attack of the wing or lifting surface reaches its peak with a rapidly decreasing forward speed thereby requiring boundary layer control.

FIGURE 2 shows the relative shaft horse power requirement and angle of attack of the tilting wing through the complete cycle of both "up" and "down" transition, in which the comparative change of conditions is clearly shown.

Boundary layer-control only becomes necessary when relatively increasing high angles of attack of the wing occur as they do during the early phases of the "down" transition, as shown in FIGURE 2, and it is in this phase that large quantities of gas are available.

When the pilot sets the controls (switch 10) for the "down" transition, that is from fixed wing to rotary wing mode, the wing with the power units commences to tilt in an arc about its pivotal axis towards the vertical position. The angle of attack of the wing increases as a result, and the power required in this initial stage of the transition reduces. This reduction of power is sensed by the engine fuel computer 11 fbrom parameters of power turbine speed as sensed by a speed sensor 16, power turbine temperature as sensed by a temperature sensor 19, ambient air pressure as sensed by a pressure sensor 5 and ambient air temperature as sensed by a further temperature sensor 6, the computer 11 then regulating the fuel flow accordingly, to maintain the correct air/fuel ratio for the particular power requirement.

A comparator 14 compares the power turbine speed from sensor 16 with power turbine temperature from sensor 19 relative to a turbine speed selector 9 and feeds a signal to engine computer 11 controlling the fuel flow from a fuel pump 3 to the engine.

A comparator 15 compares the free turbine speed from sensor 20 relative to a free turbine or rotor speed selection lever 17 and feeds the resultant signal to the operating means of valve 12 which controls the proportion of air bled from a compressor 13 through non-return valve 28 and thence over the surface of the wing. A second non-return valve 28a provides an interconnected supply from another power unit.

When, as in the instance described above, the power requirements are low, the maximum quantity of air is bled from the compressor since valve 12 is fully open, the engine speed governor will maintain a substantially constant mass flow through the compressor. This condition coincides with the critical angle of attack of the wing when the maximum boundary layer flow is required (see FIGURE 2).

When control switch 10 is set for the "up" transition, that is, from rotary wing to fixed wing mode, the differential signal output signal from comparator 14 is no longer required and thus is cut out from the system. The output signal from comparator 15 is switched from the control means operating valve 12 which is now shut off, to the engine fuel computer 11, as substantially high power is required to commence normal cruise flight, gradually reducing as the forward speed builds up and the wing produces lift.

It will be appreciated that the complete system includes a number of other conventional elements such as the fuel supply system and the drive for the rotors. Thus, to complete the description of the system of FIGURE 1, a fuel supply tank 1 is connected by means of a fuel pipe 2 through a dump valve 26 to a fuel pump 3. Fuel pump 3 supplies a metered amount of fuel as determined by fuel computer 11 to fuel injector/s 4 located in combustion chamber/s 7. The system further includes a compressor 13 described above, a power turbine 21 and a free turbine 22. Free turbine 22 is connected through a gearing arrangement including rotor transmission 25 to a shaft 24 which drives a rotor 23.

At the completion of a transition the boundary layer control is so arranged that it can be switched out of the power control circuit, either manually or automatically.

Override controls are provided for manual operation, in the event of failure of any unit in the automatic power control system.

It is apparent that the detailed engineering of this system may vary considerably, without departing from the invention.

I claim as my invention:

1. A convertible rotorcraft having at least one rotor, said at least one rotor being movable from a substantially horizontal position to a substantially vertical position for propulsion purposes, said rotor craft further comprising at least one engine power unit including a source of pressurized gas for driving said at least one lift rotor, and boundary layer control means integrated with said at least one engine power unit for providing boundary layer control of at least a part of a lift surface of the convertible rotorcraft comprising means for bleeding air from said source of pressurized gas and control means for controlling the air bled from said source of pressurized gas in accordance with the flight mode of the convertible rotorcraft.

2. A convertible rotorcraft as claimed in claim 1 wherein said control means includes means for controlling and proportioning the amount of air bled from said source of pressurized gas in accordance with an operating parameter of said at least one engine power unit.

3. A convertible rotorcraft as claimed in claim 1 wherein said lift surface comprises a tilting wing.

4. A convertible rotorcraft as claimed in claim 1 wherein said source of pressurized gas comprises a gas generator.

5. A convertible rotorcraft as claimed in claim 2 wherein said boundary layer control means includes bleed valve means, at least one comparator and means for operating said bleed valve means in accordance with the output of said at least one comparator.

6. A convertible rotorcraft as claimed in claim 5 wherein said comparator comprises a speed comparator and said operating parameter is engine speed.

7. A convertible rotorcraft as claimed in claim 2 wherein said at least one power unit includes a free turbine and said operating parameter is turbine speed.

References Cited

UNITED STATES PATENTS

| | | | |
|---|---|---|---|
| 2,969,206 | 1/1961 | Jensen | 244—42 |
| 3,058,695 | 10/1962 | Simonis | 244—42 |
| 3,179,354 | 4/1965 | Alvarez-Calderon | 244—7 X |
| 3,121,544 | 2/1964 | Alvarez-Calderon | 244—7 |
| 3,362,660 | 1/1968 | Tyler | 244—42 |

MILTON BUCHLER, Primary Examiner

T. W. BUCKMAN, Assistant Examiner

U.S. Cl. X.R.

244—42